(12) United States Patent
Pang et al.

(10) Patent No.: US 11,205,540 B2
(45) Date of Patent: Dec. 21, 2021

(54) SHIELD SHEET FOR WIRELESS CHARGING MODULE AND WIRELESS CHARGING MODULE

(71) Applicant: SUNWAY COMMUNICATION (JIANGSU) CO., LTD., Jiangsu (CN)

(72) Inventors: Zhihua Pang, Changzhou (CN); Lei Wang, Changzhou (CN); Jiahong Li, Changzhou (CN); Laili Kang, Changzhou (CN); Shuai Wang, Changzhou (CN); Kaihuang Liu, Changzhou (CN)

(73) Assignee: SUNWAY COMMUNICATION (JIANGSU) CO., LTD., Changzhou (CN)

( * ) Notice: Subject to any disclaimer, the term of this patent is extended or adjusted under 35 U.S.C. 154(b) by 245 days.

(21) Appl. No.: 16/420,536

(22) Filed: May 23, 2019

(65) Prior Publication Data
US 2019/0371519 A1 Dec. 5, 2019

(30) Foreign Application Priority Data
May 29, 2018 (CN) .......................... 201810529423.0

(51) Int. Cl.
*H01F 27/36* (2006.01)
*H02J 50/10* (2016.01)
(Continued)

(52) U.S. Cl.
CPC ............. *H01F 27/36* (2013.01); *H01F 38/14* (2013.01); *H02J 7/025* (2013.01); *H02J 50/10* (2016.02);
(Continued)

(58) Field of Classification Search
CPC .... H01F 27/36; H01F 38/14; H01F 2027/348; H01F 27/245; H02J 50/10; H02J 50/70; H02J 7/025; H02J 50/12; H02J 5/005; B32B 3/266; B32B 7/12; B32B 3/14; B32B 2307/208; B32B 2307/212
See application file for complete search history.

(56) References Cited

U.S. PATENT DOCUMENTS 5,578,359 A * 11/1996 Forbes ................. A41D 13/008
428/131
2008/0055034 A1 * 3/2008 Tsunemi ................... H01F 3/10
336/83

(Continued)

*Primary Examiner* — Nghia M Doan
(74) *Attorney, Agent, or Firm* — Oliff PLC

(57) ABSTRACT

A shield sheet comprises a collar magnetic sheet and a center magnetic sheet. The collar magnetic sheet is provided with a hole adapted to the center magnetic sheet. The center magnetic sheet has one end fixed in the hole and the other end protruding out of the collar magnetic sheet. The collar magnetic sheet comprises at least one first magnetic permeable layer, which is a nanocrystal strip, an amorphous strip or a metallic soft magnetic strip. The center magnetic sheet comprises at least two second magnetic permeable layers stacked one on another, which are fragmented nanocrystal strips, fragmented amorphous strips or fragmented metallic soft magnetic strips. Fewer nanocrystal strips are stacked for the collar magnetic sheet in the shield sheet of the invention, facilitating the miniaturization of the shield sheet and increasing charging efficiency.

8 Claims, 2 Drawing Sheets

(51) Int. Cl.
*H02J 50/70* (2016.01)
*H01F 38/14* (2006.01)
*H02J 7/02* (2016.01)
*H01F 27/34* (2006.01)

(52) U.S. Cl.
CPC ........ *H02J 50/70* (2016.02); *H01F 2027/348* (2013.01)

(56) References Cited

U.S. PATENT DOCUMENTS

| | | | |
|---|---|---|---|
| 2015/0102892 A1* | 4/2015 | Yeo | H02J 50/70 336/200 |
| 2017/0070100 A1* | 3/2017 | Su | H02J 50/12 |
| 2018/0137971 A1* | 5/2018 | Jang | H01Q 7/06 |
| 2019/0148988 A1* | 5/2019 | Hwang | H01Q 1/526 307/104 |

* cited by examiner

SHIELD SHEET FOR WIRELESS CHARGING MODULE AND WIRELESS CHARGING MODULE

TECHNICAL FIELD

The invention relates to the technical field of wireless charging, and in particular to a shield sheet for a wireless charging module and the wireless charging module.

DESCRIPTION OF RELATED ART

The wireless charging technology is a method of transmitting the energy from a transmitting end to a wireless charging receiving coil via a magnetic field by means of near field electromagnetic induction. With respect to electric field coupling, the wireless charging technology based on the principle of magnetic field coupling is closer to a conventional resonant switching power supply.

To achieve high charging efficiency and reduce the impact of the electromagnetic field to electronic devices during charging, a magnetic material needs to be used. The role played by the magnetic material is to distribute the magnetic field in the magnetic material having high magnetic permeability, and prevent energy loss and electromagnetic interference caused by the absorption of the magnetic field by parts such as metal (battery) inside the electronic devices since the magnetic field passes through the magnetic material to reach the inside of the electronic devices. Taking a mobile phone as an example, it is generally the battery that is next to a wireless charging coil. When an alternating magnetic field generated by a transmitting coil passes through the charging module to reach a surface metal layer on the battery, an induction current, i.e., the so-called eddy current, occurs, which would produce a magnetic field offsetting the changes of the magnetic field at the transmitting end to reduce the induction voltage of the receiving coil; and moreover, this eddy current may transform the energy of the magnetic field into heat, making the battery of the mobile phone very hot. Therefore, to implement the wireless charging for the mobile phone, it is necessary to place a device for "isolating the magnetic field" between the receiving coil and the battery of the mobile phone in order to prevent the magnetic field from affecting the battery. For a mobile phone from Samsung, a receiving end for wireless charging is based on the technology of amorphous electromagnetic shield sheet provided by Amotech, with the charging efficiency up to above 70%. In view of the over-high magnetic loss of an amorphous strip in the Amotech technical solution, pressure-induced magnetic sheet fragmentation is used to produce irregular cracks to allow an adhesive to enter, so that the magnetic loss $\mu''$ can be reduced to an acceptable range ($\leq 200$), thereby reducing the eddy current loss of the magnetic material per se. Accordingly, however, $\mu'$ would be reduced therewith, leading to a decrease in the magnetic permeability of a mono-layer magnetic material. Therefore, the shield sheet for wireless charging as produced with this technical solution at present needs to be stacked in a high number of layers to prevent the increase in the loss caused by magnetic flux leakage.

BRIEF SUMMARY OF THE INVENTION

A technical problem to be solved by the invention is how to provide a shield sheet for a wireless charging module, which has a compact size and is able to increase the charging efficiency.

To solve the technical problem described above, the invention employs a technical solution as follows: a shield sheet for a wireless charging module comprises a collar magnetic sheet and a center magnetic sheet, the collar magnetic sheet is provided with a hole adapted to the center magnetic sheet, the center magnetic sheet has one end fixed in the hole and the other end protruding out of the collar magnetic sheet; the collar magnetic sheet comprises at least one first magnetic permeable layer with high magnetic permeability, which is a nanocrystal strip, an amorphous strip or a metallic soft magnetic strip with high magnetic permeability; and the center magnetic sheet comprises at least two second magnetic permeable layers stacked one on another, which are fragmented nanocrystal strips, fragmented amorphous strips or fragmented metallic soft magnetic strips.

To solve the technical problem described above, the invention also employs a technical solution as follows: a wireless charging module comprises a charging coil, and further comprises the shield sheet for the wireless charging module described above, and the hole is located in a hollow area of the charging coil.

Further, an inner edge face of the charging coil supports against an outer edge face of the center magnetic sheet.

The invention has the following advantageous effects: since the collar magnetic sheet is perpendicular to the direction of the induction eddy current and meanwhile there is the insulating adhesive between the stacked nanocrystal strips, the collar magnetic sheet per se would not produce long free-path eddy currents regardless of the magnetic loss $\mu''$ of the collar magnetic sheet, therefore, the collar magnetic sheet can remain ultrahigh in magnetic permeability without high eddy-current losses; and in addition, the fragmentation of the center magnetic sheet may inhibit the occurrence of the long free-path eddy current to reduce the eddy-current loss, though the eddy current produced by the magnetic field is inside the plane of the center magnetic sheet. Compared with the traditional magnetic shield sheet, the shield sheet of the invention has a smaller stacking number of the collar magnetic sheets with respect to the same shielding performance, moreover, the center magnetic sheet can be rightly embedded in the center of the charging coil without affecting the thickness of the module, thereby facilitating the miniaturization of the shield sheet and meanwhile increasing the charging efficiency.

EXPLANATIONS FOR REFERENCE SIGNS

1, collar magnetic sheet; 2, center magnetic sheet; 3, through hole; 4, charging coil; 5, adhesive layer.

DETAILED DESCRIPTION OF THE INVENTION

To illustrate the technical contents, objects achieved and effects of the invention in detail, the illustration will be given below in conjunction with the implementations and drawings.

The most crucial concept of the invention lies in that the shield sheet comprises the collar magnetic sheet having high magnetic permeability and the center magnetic sheet having low magnetic permeability; the collar magnetic sheet is provided with a through hole; the center magnetic sheet has one end located in the through hole and the other end protruding out of the collar magnetic sheet to enter the hollow area of the charging coil.

Figure 1:
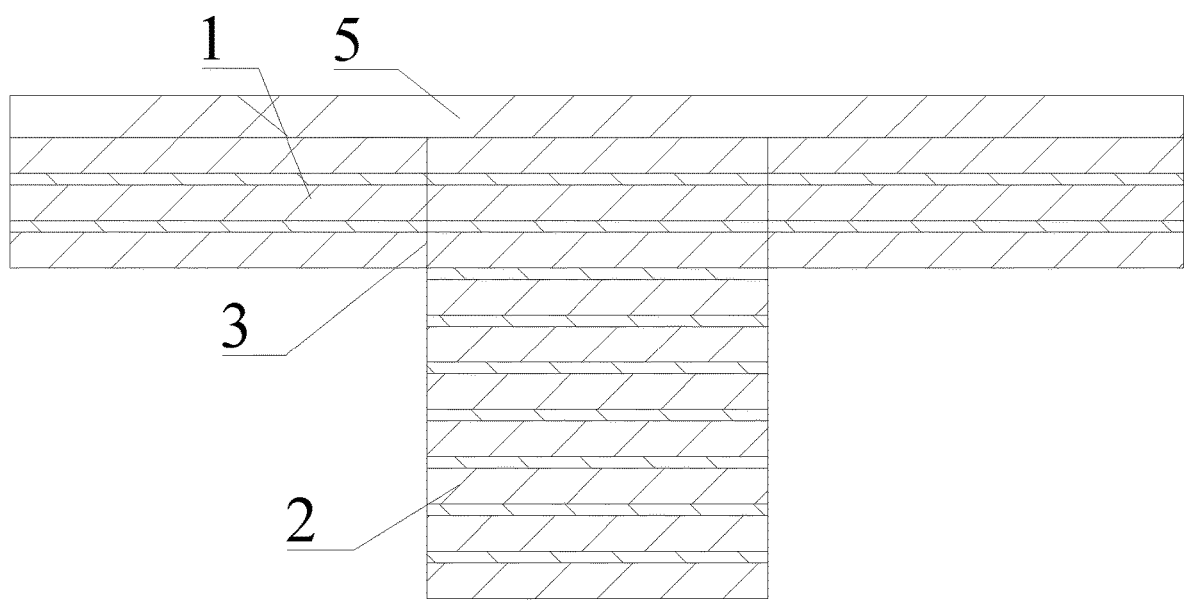
FIG. 1 is a sectional (schematic) view of a shield sheet for a wireless charging module according to Embodiment 1 of the invention.
Figure 2:
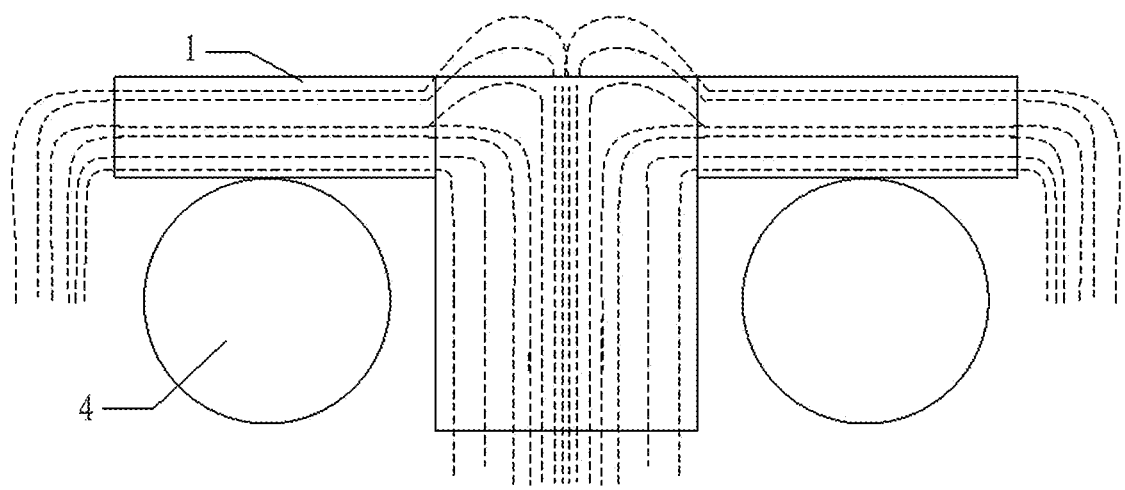
FIG. 2 is a (schematic) view showing the working principle of the shield sheet for the wireless charging module according to Embodiment 1 of the invention.

With reference to FIG. 1 and FIG. 2, a shield sheet for a wireless charging module comprises a collar magnetic sheet 1 and a center magnetic sheet 2, wherein the collar magnetic sheet 1 is provided with a hole adapted to the center magnetic sheet 2, and the center magnetic sheet 2 has one end fixed in the hole and the other end protruding out of the collar magnetic sheet 1; the collar magnetic sheet 1 comprises at least one first magnetic permeable layer, which is a nanocrystal strip, an amorphous strip or a metallic soft magnetic strip; and the center magnetic sheet 2 comprises at least two second magnetic permeable layers stacked one on another, which are fragmented nanocrystal strips, fragmented amorphous strips or fragmented metallic soft magnetic strips.

The structure/working principle of the invention is briefed as follows: magnetic lines of force perpendicular to the collar magnetic sheet 1 induce the center magnetic sheet 2 to produce eddy currents in parallel with the collar magnetic sheet 1, and the fragmented center magnetic sheet 2 suppresses the occurrence of the eddy current to reduce the eddy-current loss; and the magnetic lines of force in parallel with the collar magnetic sheet 1 induce the collar magnetic sheet 1 to produce eddy currents perpendicular to the collar magnetic sheet 1, and large eddy currents cannot be produced from the collar magnetic sheet 1 per se since the nanocrystal strip, amorphous strip or metallic soft magnetic strip per se in the collar magnetic sheet 1 have small thickness (only 10-30 μm) and there is high molecular adhesive among the layers.

As can be known from the description above, the invention has the following advantageous effects: since the collar magnetic sheet is perpendicular to the direction of the induction eddy current and meanwhile there is the insulating adhesive between the stacked nanocrystal strips, the collar magnetic sheet per se would not produce long free-path eddy currents regardless of the magnetic loss μ" of the collar magnetic sheet, therefore, the collar magnetic sheet can remain ultrahigh in magnetic permeability without high eddy-current losses; and in addition, the fragmentation of the center magnetic sheet may inhibit the occurrence of the long free-path eddy current to reduce the eddy-current loss, though the eddy current produced by the magnetic field is inside the plane of the center magnetic sheet. Compared with the traditional magnetic shield sheet, the shield sheet of the invention has a smaller stacking number of the collar magnetic sheets with respect to the same shielding performance, moreover, the center magnetic sheet can be rightly embedded in the center of the charging coil without affecting the thickness of the module, thereby facilitating the miniaturization of the shield sheet and meanwhile increasing the charging efficiency somewhat.

Further, the hole is a through hole 3, and the collar magnetic sheet 1 has a top face coplanar with a top face of the center magnetic sheet 2.

Further, the top face of the collar magnetic sheet 1 is provided with an adhesive layer 5, and the top face of the center magnetic sheet 2 is joined with the adhesive layer 5.

Further, the second magnetic permeable layers are provided with air gaps, which make the second magnetic permeable layer fragmented.

Further, the air gaps are grid-like.

As can be known from the description above, the air gaps are formed from die cutting by a die cutter, and the traditional "magnetic sheet fragmentation" process does not need to be used in the production process of the shield sheet, which is good for reducing the manufacturing procedures and manufacturing cost for the shield sheet; and in addition, the shape of the air gaps can be designed by the manufacturer to eliminate the randomness in the existing "magnetic sheet fragmentation" technology and facilitate the control over the magnetic permeability of the second magnetic permeable layer by the manufacturer.

Further, the second magnetic permeable layers have the magnetic permeability of 200-6000; the first magnetic permeable layer is the nanocrystal strip having the magnetic permeability of more than or equal to 5000, the amorphous strip having the magnetic permeability of more than 1000, or the metallic soft magnetic strip having the magnetic permeability of more than or equal to 800.

Further, the collar magnetic sheet 1 is formed by stacking two or three layers of nanocrystal strips.

Further, two adjacent layers of nanocrystal strips in the collar magnetic sheet 1 are bonded with an insulating adhesive.

As can be known from the description above, when the first magnetic permeable layer is the nanocrystal strip, the number of layers of the nanocrystal strip in the collar magnetic sheet is far smaller than that in the traditional nanocrystal shield sheet, thereby facilitating the miniaturization of the shield sheet.

A wireless charging module comprises a charging coil 4, and further comprises the shield sheet for the wireless charging module described above, and the hole is located in a hollow area of the charging coil 4.

Further, an inner edge face of the charging coil 4 supports against an outer edge face of the center magnetic sheet 2.

A method for preparing a shield sheet for a wireless charging module comprises the following steps:

Step 1: providing nanocrystal strips and thermally treating the nanocrystal strips;

Step 2: covering the nanocrystal strips from Step 1 with an adhesive;

Step 3: stacking N nanocrystal strips and bonding two adjacent nanocrystal strips (if N>1) to obtain a first nanocrystal magnetic sheet, wherein N is an integer more than or equal to 1; and stacking M nanocrystal strips and bonding two adjacent nanocrystal strips to obtain a second nanocrystal magnetic sheet, wherein M is an integer more than or equal to 2 and is more than N;

Step 4: die-cutting the first nanocrystal magnetic sheet to form a profile and a through hole 3, obtaining a collar magnetic sheet 1; and die-cutting the second nanocrystal magnetic sheet to form a profile and air gaps, obtaining a center magnetic sheet 2, wherein the center magnetic sheet 2 is adapted to the through hole 3;

Step 5: inserting one end of the center magnetic sheet 2 in the through hole 3 in such a manner that the top face of the center magnetic sheet 2 is coplanar with the top face of the collar magnetic sheet 1.

Further, after Step 5, the method further comprises the step of bonding the top faces of the center magnetic sheet 2 and the collar magnetic sheet 1 on the same adhesive layer 5.

Further, N is 2 or 3, and M is any numeric value from 3 to 12.

Further, in Step 1, the nanocrystal strips are thermally treated by a thermal treatment furnace; and there is also a step of coiling the nanocrystal strips before putting the nanocrystal strips into the thermal treatment furnace.

Further, a roller-to-roller adhesive covering process is used to cover the nanocrystal strips with the adhesive in Step 2.

Embodiment 1

With reference to FIG. 1 and FIG. 2, Embodiment 1 of the invention is as follows: a wireless charging module comprises a charging coil 4 and a shield sheet for the wireless charging module; the shield sheet for the wireless charging module comprises a collar magnetic sheet 1 and a center magnetic sheet 2, wherein the collar magnetic sheet 1 is provided with a hole adapted to the center magnetic sheet 2, and the center magnetic sheet 2 has one end fixed in the hole and the other end protruding out of the collar magnetic sheet 1; the collar magnetic sheet 1 comprises at least one first magnetic permeable layer, which is a nanocrystal strip, an amorphous strip or a metallic soft magnetic strip; the center magnetic sheet 2 comprises at least two second magnetic permeable layers stacked one on another, which are fragmented nanocrystal strips, fragmented amorphous strips or fragmented metallic soft magnetic strips; and the hole is located in a hollow area of the charging coil 4.

The metallic soft magnetic strip includes but not limited to an industrial pure-iron thin strip, a Fe—Si strip and a permalloy strip.

The hole is a through hole 3, and the collar magnetic sheet 1 has a top face coplanar with a top face of the center magnetic sheet 2. In this embodiment, the top face of the collar magnetic sheet 1 is provided with an adhesive layer 5, and the top face of the center magnetic sheet 2 is joined with the adhesive layer 5.

In this embodiment, the second magnetic permeable layers are provided with air gaps, which make the second magnetic permeable layer fragmented. Optionally, the air gaps are grid-like; and certainly, the air gaps may also be in other shapes such as a triangular framework in other embodiments.

Optionally, the second magnetic permeable layers have the magnetic permeability of 200-6000; the first magnetic permeable layer is the nanocrystal strip having the magnetic permeability of more than or equal to 5000, the amorphous strip having the magnetic permeability of more than 1000, or the metallic soft magnetic strip having the magnetic permeability of more than or equal to 800.

Optionally, the collar magnetic sheet 1 is formed by stacking two or three layers of nanocrystal strips, the center magnetic sheet 2 is formed by stacking 3-12 nanocrystal strips, and the two adjacent layers of nanocrystal strips in both the collar magnetic sheet 1 and the center magnetic sheet 2 are bonded with the insulating adhesive. Preferably, the thickness of the nanocrystal strip is 10-30 μm; and the center magnetic sheet 2 is formed by stacking 6-12 nanocrystal strips.

Further, the charging coil 4 is bonded on the collar magnetic sheet 1 with a pressure-sensitive adhesive, and an inner edge face of the charging coil 4 supports against an outer edge face of the center magnetic sheet 2.

A method for preparing a shield sheet for a wireless charging module comprises the following steps:

Step 1: providing nanocrystal strips and thermally treating the nanocrystal strips;

Step 2: covering the nanocrystal strips from Step 1 with an adhesive;

Step 3: stacking N nanocrystal strips and bonding two adjacent nanocrystal strips (if N>1) to obtain a first nanocrystal magnetic sheet, wherein N is an integer more than or equal to 1; and stacking M nanocrystal strips and bonding two adjacent nanocrystal strips to obtain a second nanocrystal magnetic sheet, wherein M is an integer more than or equal to 2 and is more than N;

Step 4: die-cutting the first nanocrystal magnetic sheet to form a profile and a through hole, obtaining a collar magnetic sheet; and die-cutting the second nanocrystal magnetic sheet to form a profile and air gaps, obtaining a center magnetic sheet, wherein the center magnetic sheet is adapted to the through hole; and the performance requirements for the center magnetic sheet are as follows: the magnetic permeability $\mu'$ is 200-2000, and the magnetic loss $\mu''$ is less than 200;

Step 5: inserting one end of the center magnetic sheet in the through hole in such a manner that the top face of the center magnetic sheet is coplanar with the top face of the collar magnetic sheet.

Further, after Step 5, the method further comprises the step of bonding the top faces of the center magnetic sheet and the collar magnetic sheet on the same adhesive layer.

N is 2 or 3, and M is any numeric value from 3 to 12.

The inventor made a batch of samples and conducted tests on these samples.

The type of the nanocrystal alloy strip is 1K107b with the thickness of 20 μm.

A nitrogen furnace is used to thermally treat the nanocrystal strips. The thermal treatment process is specifically as follows: raising the temperature of the nanocrystal strips from 450° C. to 600° C. along with the furnace, preserving the heat for 2 hours, then cooling to 250° C. at the rate of 500° C./h and discharging the nanocrystal strips;

covering the thermally treated strips with an adhesive on single side;

laminating part of the strips covered with the adhesive on single side, die-cutting to form a profile and a through hole by a die cutter, obtaining two-layer and three-layer first nanocrystal magnetic sheet, with the parameters thereof as shown in Table 1;

TABLE 1

Parameters of the first nanocrystal magnetic sheet

| Item | No. | Number of Layers | Thickness (μm) | Magnetic Permeability $\mu'$ | Magnetic Loss $\mu''$ |
|---|---|---|---|---|---|
| First Nanocrystal Magnetic Sheet | L2 | 2 | 55 | 13675 | 3250 |
| | L3 | 3 | 80 | | | laminating the other part of the strips covered with the adhesive on single side to obtain six-layer, nine-layer and twelve-layer second nanocrystal magnetic sheets; die-cutting to form a profile and air gaps by the die cutter to allow 0.01-0.2 mm grid-like air gaps to be formed in the second nanocrystal magnetic sheet, with the magnetics parameters of the die-cut second nanocrystal magnetic sheets as shown in Table 2; and

TABLE 2

Parameters of the second nanocrystal magnetic sheet

| Item | No. | Number of Layers | Inductance (L/μH) | Magnetic Permeability μ' | Magnetic Loss μ" |
|---|---|---|---|---|---|
| Second Nanocrystal Magnetic Sheet | U6 | 6 | 9.0 | 600 | 50 |
| | U10 | | 9.25 | 1000 | 90 |
| | U14 | | 9.5 | 1400 | 130 |
| | P9 | 9 | 9.65 | 1400 | 130 |
| | P12 | 12 | 9.75 | 1400 | 130 | inserting one end of the second nanocrystal magnetic sheet in the through hole of the first nanocrystal magnetic sheet in such a manner that the top faces of the first and second nanocrystal magnetic sheets are coplanar and are bonded through an adhesive layer.

Test: the magnetic sheets of the prepared samples 1 to 7 are assembled into a wireless charging module, and then a charging performance test is performed thereon. For a better comparison with the shield sheet prepared with the traditional technology, the inventor also added the wireless charging modules corresponding to the three-layer and five-layer nanocrystal shield sheets manufactured with the traditional technology, as contrast samples 8 and 9, and the sample test results are shown in Table 3.

TABLE 3

Comparison of sample test results

| SN | Combination No. | Coil Inductance (L/μH) | Quality Factor Q |
|---|---|---|---|
| Sp1 | L3U6 | 8.35 | 20.3 |
| Sp2 | L3U10 | 8.36 | 20.5 |
| Sp3 | L3U14 | 8.36 | 20.7 |
| Sp4 | L3P9 | 8.37 | 20.8 |
| Sp5 | L3P12 | 8.39 | 21 |
| Sp6 | L2U10 | 8.31 | 20.1 |
| Sp7 | L2P12 | 8.36 | 20.7 |
| Sp8 | Three-layer Nanocrystal (μ' = 1400) | 7.9 | 19.2 |
| Sp9 | Five-layer Nanocrystal (μ' = 800) | 8.18 | 18.7 |

As can be known from Table 3, the wireless charging module making use of the shield sheet of the invention has the inductance higher than that of the contract samples 8 and 9 on the whole, and meanwhile, there is also a significant increase of the value Q.

A 5W platform is used to perform charging efficiency test comparison on the samples 1-9, with the test results shown in Table 4.

TABLE 4

Comparison of charging efficiency test on 5 W platform

| Current at Receiving End (A) | Item | | | | | | | | |
|---|---|---|---|---|---|---|---|---|---|
| | Sp1 | Sp2 | Sp3 | Sp4 | Sp5 | Sp6 | Sp7 | Sp8 | Sp9 |
| | Charging Efficiency (%) | | | | | | | | |
| 0.5 | 78.78 | 78.69 | 79.14 | 79.20 | 79.56 | 78.85 | 78.65 | 74.82 | 78.44 |
| 0.6 | 79.75 | 79.67 | 80.19 | 80.19 | 80.64 | 79.94 | 79.65 | 75.48 | 79.25 |
| 0.7 | 80.04 | 80.14 | 80.71 | 80.74 | 81.06 | 80.43 | 80.29 | 75.54 | 79.30 |
| 0.8 | 80.11 | 80.13 | 80.58 | 80.51 | 80.92 | 80.25 | 80.28 | 75.13 | 78.92 |
| 0.9 | 79.68 | 79.61 | 80.25 | 80.15 | 80.60 | 79.79 | 79.95 | 74.60 | 78.15 |
| 1 | 78.89 | 78.91 | 79.34 | 79.37 | 79.70 | 78.98 | 79.37 | 74.08 | 77.34 |
| 1.1 | 77.77 | 77.93 | 78.25 | 78.38 | 78.64 | 77.99 | 78.37 | 73.16 | 76.31 |

From the comparative analysis on the charging efficiency, as shown in Table 4, the charging efficiency of the wireless charging module making use of the shield sheet of the invention is far higher than that of the wireless charging module making use of the traditional shield sheet of the same number of layers, and is increased by about 2% even compared with the five-layer nanocrystal magnetic material having higher thickness.

Above all, compared with the traditional magnetic shield sheet, the shield sheet for the wireless charging module as provided by the invention has a smaller stacking number of the nanocrystal strips of the collar magnetic sheet in the shield sheet of the invention with respect to the same shielding performance, moreover, the center magnetic sheet can be rightly embedded in the center of the charging coil without affecting the thickness of the module, thereby facilitating the miniaturization of the shield sheet and meanwhile increasing the charging efficiency somewhat; and in addition, the traditional "magnetic sheet fragmentation" process does not need to be used in the production process of the shield sheet, which is good for reducing the manufacturing procedures and manufacturing cost for the shield sheet.

The description above only provides the embodiments of the invention, but is not intended to limit the patent scope of the invention, and any equivalent transformations made based on the specification and drawings of the invention and any direct or indirect applications in relevant technical fields are likewise construed to be fall within the patent scope of the invention.

The invention claimed is:

1. A shield sheet for a wireless charging module, comprising a collar magnetic sheet and a center magnetic sheet, wherein the collar magnetic sheet is provided with a hole adapted to the center magnetic sheet, and the center magnetic sheet has one end fixed in the hole and the other end protruding out of the collar magnetic sheet; the collar magnetic sheet comprises at least one first magnetic permeable layer, which is a nanocrystal strip, an amorphous strip or a metallic soft magnetic strip; and the center magnetic sheet comprises at least two second magnetic permeable layers stacked one on another, which are fragmented nanocrystal strips, fragmented amorphous strips or fragmented metallic soft magnetic strips, wherein the at least two second magnetic permeable layers of the center magnetic sheet are stacked one on another in a first direction, and the center magnetic sheet is thicker in the first direction than the collar magnetic sheet in the first direction.

2. The shield sheet for the wireless charging module according to claim 1, wherein the hole is a through hole, and the collar magnetic sheet has a top face coplanar with a top face of the center magnetic sheet.

3. The shield sheet for the wireless charging module according to claim 2, wherein the top face of the collar magnetic sheet is provided with an adhesive layer, and the top face of the center magnetic sheet is joined with the adhesive layer.

4. The shield sheet for the wireless charging module according to claim 1, wherein the second magnetic permeable layers have the magnetic permeability of 200-6000; the first magnetic permeable layer is the nanocrystal strip having the magnetic permeability of more than or equal to 5000, the amorphous strip having the magnetic permeability of more than 1000, or the metallic soft magnetic strip having the magnetic permeability of more than or equal to 800.

5. The shield sheet for the wireless charging module according to claim 4, wherein the collar magnetic sheet is formed by stacking two or three layers of nanocrystal strips.

6. The shield sheet for the wireless charging module according to claim 5, wherein two adjacent layers of nanocrystal strips in the collar magnetic sheet are bonded with an insulating adhesive.

7. A wireless charging module, comprising a charging coil, wherein the wireless charging module further comprises the shield sheet for the wireless charging module according to claim 1, and a portion of the center magnetic sheet is located in a hollow area of the charging coil.

8. The wireless charging module according to claim 7, wherein an inner edge face of the charging coil supports against an outer edge face of the center magnetic sheet.

* * * * *